US005923017A

United States Patent [19]

Bjorner et al.

[11] Patent Number: 5,923,017

[45] Date of Patent: Jul. 13, 1999

[54] MOVING-LIGHT INDICIA READER SYSTEM

[75] Inventors: Johnannes A. S. Bjorner, Woodbury; Bennett Pardee, Redding; Catherine Alexander, Danbury, all of Conn.

[73] Assignee: United Parcel Service of America, Danbury, Conn.

[21] Appl. No.: 08/788,852

[22] Filed: Jan. 23, 1997

[51] Int. Cl.$^{6}$ .............................. G06K 7/10; G06F 17/60

[52] U.S. Cl. ........................................ 235/385; 235/462.2

[58] Field of Search .................................... 235/432, 456, 235/462, 474, 454, 466; 382/50, 68; 250/222.1

[56] References Cited

U.S. PATENT DOCUMENTS

| | | | |
|---|---|---|---|
| 3,515,254 | 6/1970 | Gary | 198/21 |
| 3,802,548 | 4/1974 | Wentz et al. | 198/40 |
| 4,516,265 | 5/1985 | Kizu et al. | 382/48 |
| 4,742,555 | 5/1988 | Tonkin | 382/50 |
| 5,103,489 | 4/1992 | Miette . | |
| 5,140,141 | 8/1992 | Inagaki et al. | 235/462 |
| 5,202,557 | 4/1993 | Robertson . | |
| 5,272,322 | 12/1993 | Nishida et al. | 235/462 |
| 5,308,960 | 5/1994 | Smith et al. | 235/454 |
| 5,327,171 | 7/1994 | Smith et al. | 348/223 |
| 5,492,199 | 2/1996 | Shimoyama . | |
| 5,497,314 | 3/1996 | Novak . | |
| 5,525,786 | 6/1996 | Dumont . | |
| 5,528,022 | 6/1996 | Nakazawa | 235/436 |
| 5,560,450 | 10/1996 | Kouno . | |
| 5,609,223 | 3/1997 | Iizaka et al. . | |
| 5,635,699 | 6/1997 | Cherry et al. | 235/462 |
| 5,679,941 | 10/1997 | Iizaka et al. . | |
| 5,719,678 | 2/1998 | Reynolds et al. . | |

FOREIGN PATENT DOCUMENTS

| | | |
|---|---|---|
| 0 647 479 A2 | 4/1995 | European Pat. Off. . |
| 0 647 479 A3 | 4/1995 | European Pat. Off. . |
| 1 270 801 | 4/1972 | United Kingdom . |

OTHER PUBLICATIONS

IBM Technical Disclosure Bulletin, Parcel Postitioning Scanning and Sorting System, vol. 15, No. 4, Sep. 1972, pp. 1170–1171.

*Primary Examiner*—Thien Minh Le
*Attorney, Agent, or Firm*—Jones & Askew, LLP

[57] ABSTRACT

A moving-light indicia reader system including a conveyor 12 carrying parcel 14 bearing a destination address 20. A moving-light illumination source 24 defines a spot 30 that moves at the same speed as the conveyor 12 to assist the positioning of the parcel 14 on the conveyor 12. A scanner 36 and a computer memory 42 of a character recognition system 40 are operated so as to store an image of a region 50 defined-with respect to the moving spot 30 defined by the moving-light illumination source 24. A sensor assembly 32, including a height sensor and reflectivity sensor, is located toward the downstream end of the moving-light illumination source 24. The scanner 32 is focused in response to height data from the height sensor, and the gain of the scanner 32 is adjusted in response to reflectivity data from the reflectivity sensor, so that the scanner 32 generates a clear image of the top of the parcel 14 at the location of the spot 30 as the parcel 14 passes beneath the scanner 32. A multi-conveyor indicia reader system 100 includes a plurality of moving-light indicia reader systems 10*a* through 10*n* that are operated so as to time division multiplex the storage of the images generated by the several moving-light indicia reader systems.

3 Claims, 7 Drawing Sheets

MOVING-LIGHT INDICIA READER SYSTEM

TECHNICAL FIELD

The present invention relates to image processing and more particularly relates to over-the-belt optical character recognition (OCR) systems. Specifically, the invention relates to an indicia reader system that includes a projected optical guide to assist the positioning of parcels on a conveyor.

BACKGROUND OF THE INVENTION

For years, machines have been used to scan parcels as they move along a conveyor. Over-the-belt optical character recognition (OCR) systems have been recently developed that can read indicia, such as a typed or hand-written destination address on parcels to be shipped. Parcel delivery companies, such as United Parcel Service, ship millions of parcels every day. These parcel delivery companies make extensive use of OCR systems to read the destination address labels on parcels to facilitate sorting and routing the parcels to their proper destinations.

The fundamental physical components of an OCR system are a scanner and a character recognition system including a central processing unit (CPU), a computer memory, and a sophisticated character recognition program module. The scanner is typically an optical camera, such as a charge-coupled device (CCD) array, that captures an image of the destination address on the parcels as they travel past the scanner on the conveyor. Generally, a continuous video image of the conveyor carrying the parcels is captured by the scanner, which video image is converted into digital format and transmitted to the character recognition system. But only a small part of the video image, such as the portions including the destination addresses of the parcels, needs to be processed by the character recognition system. The OCR system, therefore, must have some way to identify the portions of the video image that need to be processed by the character recognition system.

One approach is to store the entire video image created by the scanner, and later parse out the portions of the video image that need to be processed by the character recognition system. But a continuously running scanner generates an enormous amount of video data. This data is formatted as a continuous bit map of the conveyor as the conveyor carries parcels past the scanner, which bit map inherently convey information about the spatial relationship of the pixels of the image. Storing this continuous bit map requires an enormous amount of computer memory. It is therefore advantageous to reduce the memory storage requirement.

Data compression is one technique for reducing the memory storage requirement. The video data may be compressed for storage using any of a variety of well known data compression methods, such as run length encoding. These data compression techniques, however, alter the bit-map format of the data. This is undesirable because it is advantageous for the character recognition program module to operate on bit maps that allow easy access to information regarding neighborhoods around individual pixels. The compressed data must therefore be uncompressed, typically into a frame buffer, for processing by the character recognition program module. Compressing the video data for storage, and then uncompressing the video data for processing, burdens the CPU and slows the character recognition process.

Real-time extraction of the desired portions of the video data is another technique for reducing the memory storage requirement. Indeed, real-time data extraction is a very effective technique because most of the video data created by the continuously running scanner is a useless image of the conveyor and the non-indicia bearing areas of the parcels moving along the conveyor; only a small percentage of the data includes the destination addresses of the parcels to be shipped. Therefore, extracting only small portions of the video data, such as relatively small areas covering the destination addresses, greatly reduces the memory storage requirement and speeds up the character recognition process.

Systems have been developed for triggering a video camera system so as to store only desired video images. For example, Tonkin, U.S. Pat. No. 4,742,555, describes a mechanical limit switch, optical sensor, or magnetic sensor that triggers a video system to capture and store an image of a parcel as the parcel reaches a predetermined location along a conveyor. But the system described by Tonkin would have a significant drawback if applied to a parcel shipping system. This is because the system described by Tonkin captures an image of the entire parcel; is not operative for capturing only a specific portion of the image, such as the destination address. In a parcel shipping system, the destination address must be captured for sorting and routing purposes, but other indicia on the parcel, such as the return address, is not needed to route the parcel to its proper destination. It is therefore advantageous to identify the destination address prior to storing the image of the parcel, so that only the portion of the image containing the destination address may be stored in the computer memory.

Several difficulties are encountered, however, in attempting to identify the destination addresses on various parcels traveling on a conveyor. First, the destination addresses may vary in size, and may be in different locations on different parcels. Second, the parcels themselves may vary in size, shape, and position on the conveyor. Thus, the exact position of a destination address on a parcel cannot be determined by simply detecting the edge of the parcel using a limit switch or sensor, as described by Tonkin.

Systems have been developed for storing video images of selected portions of parcels traveling of a conveyor. For example, Kizu et al., U.S. Pat. No. 4,516,265, describes a two camera system that reads the postal (zip) codes on envelopes traveling on an envelope transport system. The system includes a low resolution prescanner that coarsely scans the surface of the envelope. The position of the destination address block is determined from the coarse scan, and the coordinates of the destination address block with respect to the leading edge of the envelope are then passed to a second, high-resolution camera system. The second camera system stores an image of the destination address block by first detecting the leading edge of the envelope. The second camera system begins storing an image of the destination address block when the block reaches the second camera, and stops storing the image when the block moves past the second camera. A postal code reader subsequently processes the high-resolution scan to read the postal code.

Another example is disclosed in the commonly owned U.S. patent application, Ser. No. 08/536,512, entitled "Two Camera System for Locating and Storing Indicia on Conveyed Items." This application describes a two camera system that reads the destination addresses on parcels traveling on a conveyor. A fluorescent ink fiduciary mark is superimposed relative to the destination address on a parcel. A first camera captures an image of the fiduciary mark, the position and orientation of which is ascertained. The position and orientation of the fiduciary mark is then used to extract an image of the destination address from a video data signal created by a second camera, which is positioned downstream from the first camera. The image of the destination address is stored in a computer memory for subsequent processing by a character recognition system.

The two camera systems described above are very effective at minimizing the amount of video data that must be stored in an OCR system by identifying indicia, such as the destination address on a parcel traveling on a conveyor, to be imaged and stored for processing by the OCR system.. They are, however, rather expensive systems that are best suited for very high-speed parcel handling systems. The cost associated with these systems may not be justified for many lower-speed parcel handling systems. There is, therefore, a need for a less expensive system for identifying indicia, such as the destination address on a parcel traveling on a conveyor, to be imaged and stored for processing by an OCR system. In particular, there is a need for an inexpensive indicia reader system suited to low- to medium-speed parcel handling systems.

SUMMARY OF THE INVENTION

The invention seeks to provide a low-cost system for identifying indicia, such as the destination address on a parcel traveling on a conveyor, to be imaged and stored for processing by an OCR system. In particular, the invention seeks to provide an inexpensive indicia reader system that is suited to low- to medium-speed parcel handling systems.

In accordance with the invention, this object is accomplished in an indicia reader system that includes an optical guide to assist the positioning of parcels on a conveyor. An operator positions a parcel on the conveyor so that indicia to be imaged, such as the destination address on the parcel, coincides with a spot defined by an illumination source. A scanner located downstream of the illumination source captures an image of a region that is defined with respect to the spot defined by the illumination source.

For example, the optical guide may include a moving light, such as a narrow-beam spot light, that is projected onto the conveyor, and that travels at the same speed as the conveyor. Positioning a parcel on the conveyor so that the spot light is located in the center of the city and state address lines of the destination address allows a scanner to efficiently capture an image of the destination address for processing by a character recognition reader. The present invention thus provides an inexpensive indicia reader system that is suited to low- to medium-speed parcel handling systems.

According to an aspect of the invention, an indicia reader system includes a conveyor for transporting a parcel from an upstream location of the conveyor to a downstream location of the conveyor. A moving-light system, which is preferably positioned above the conveyor, includes an illumination source for defining a spot that moves at the same speed as the conveyor to assist in positioning the parcel on the conveyor. A scanner, which is located downstream from the moving-light illumination source, and a processing module are operated so as to store an image of a region of the parcel defined with respect to the spot defined by the moving-light illumination source. For example, the illumination source may define a spot that is substantially smaller than the region to be imaged by the scanner of the indicia reader system. An operator may then position a parcel so that the spot defined by the moving-light illumination source is located approximately in the center of the city and state lines of the destination address on the parcel.

A moving-light indicia reader system may also include a reflectivity sensor located upstream of the scanner and positioned to determine reflectivity data associated with the parcel. Reflectivity data from the reflectivity sensor is obtained for the spot defined by the moving-light illumination source so that reflectivity data is collected regarding the parcel at the region to be captured and stored for subsequent processing by a character recognition system. A communication link transmits this reflectivity data from the reflectivity sensor to the scanner, and the gain of the scanner is adjusted in response to the reflectivity data. In addition, a moving-light indicia reader system may include a height sensor located above and upstream of the scanner and positioned to determine height data associated with the parcel at the location of the destination address. Height data from the height sensor is obtained for the spot defined by the moving-light illumination source so that height data is collected regarding the parcel at the region to be captured and stored for subsequent processing by the character recognition system. A communication link transmits this height data from the height sensor to the scanner, and the scanner is focused in response to the height data.

According to another aspect of the invention, a multi-conveyor indicia reader system includes a plurality of moving-light indicia reader systems, wherein each moving-light indicia reader system includes an illumination source for defining a spot that moves at the same speed as its respective conveyor to assist in positioning parcels on the conveyor. The processing module and the scanner of each moving-light indicia reader system are operated so as to store an image of a region of the parcel defined with respect to the spot defined by the illumination source. In addition, the illumination sources are operated so as to time-division multiplex the storage of the images generated by the several moving-light indicia reader systems.

That the present invention improves over the drawbacks of the prior art and accomplishes the objects of the invention will become apparent from the following detailed description of the preferred embodiment and the appended drawings and claims.

BRIEF DESCRIPTION OF THE DRAWINGS

FIG. 1, including

DETAILED DESCRIPTION

Figure 1A:
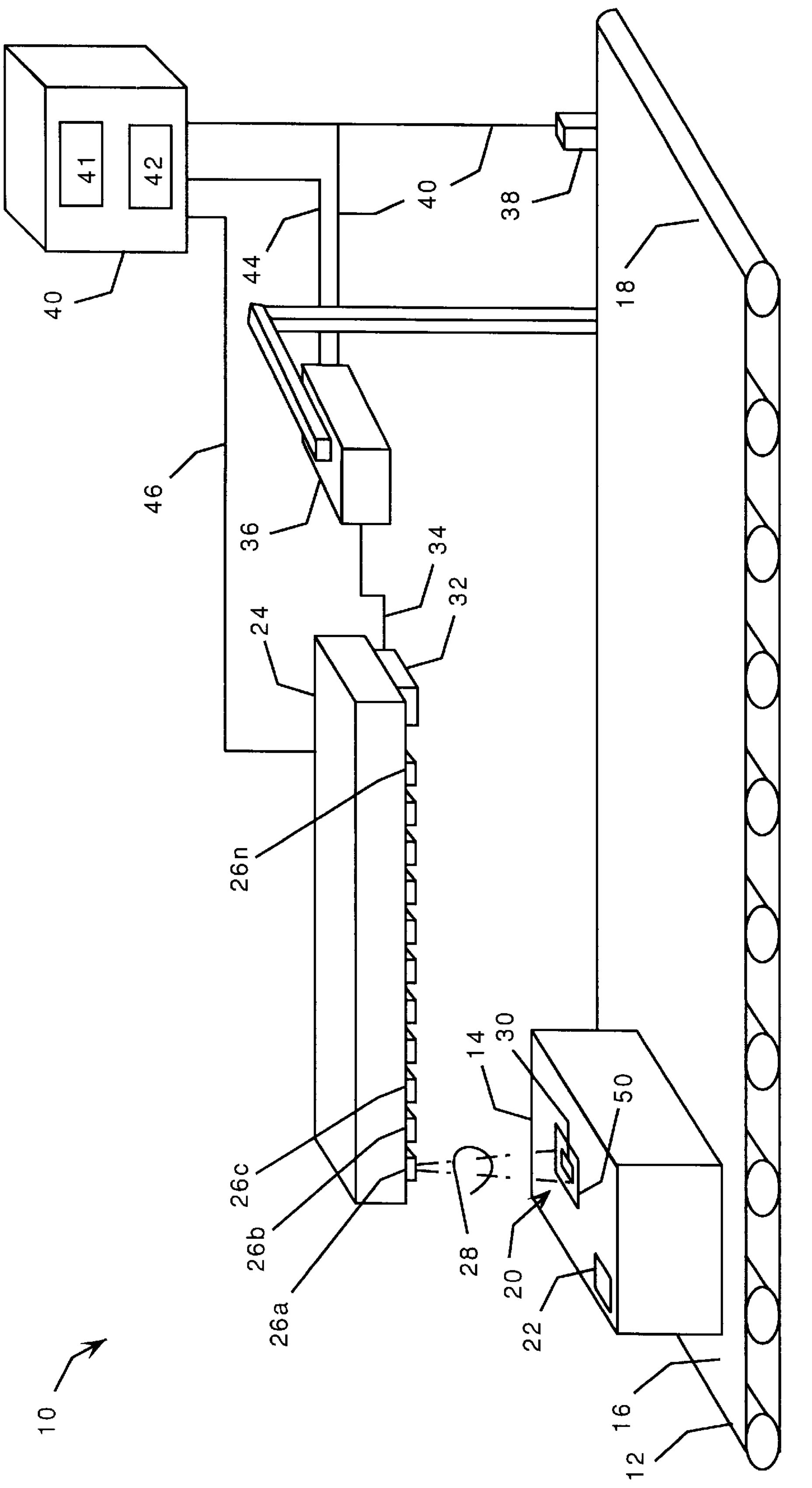
FIGS. 1A–1E, illustrates a moving-light indicia reader system.
Figure 1B:
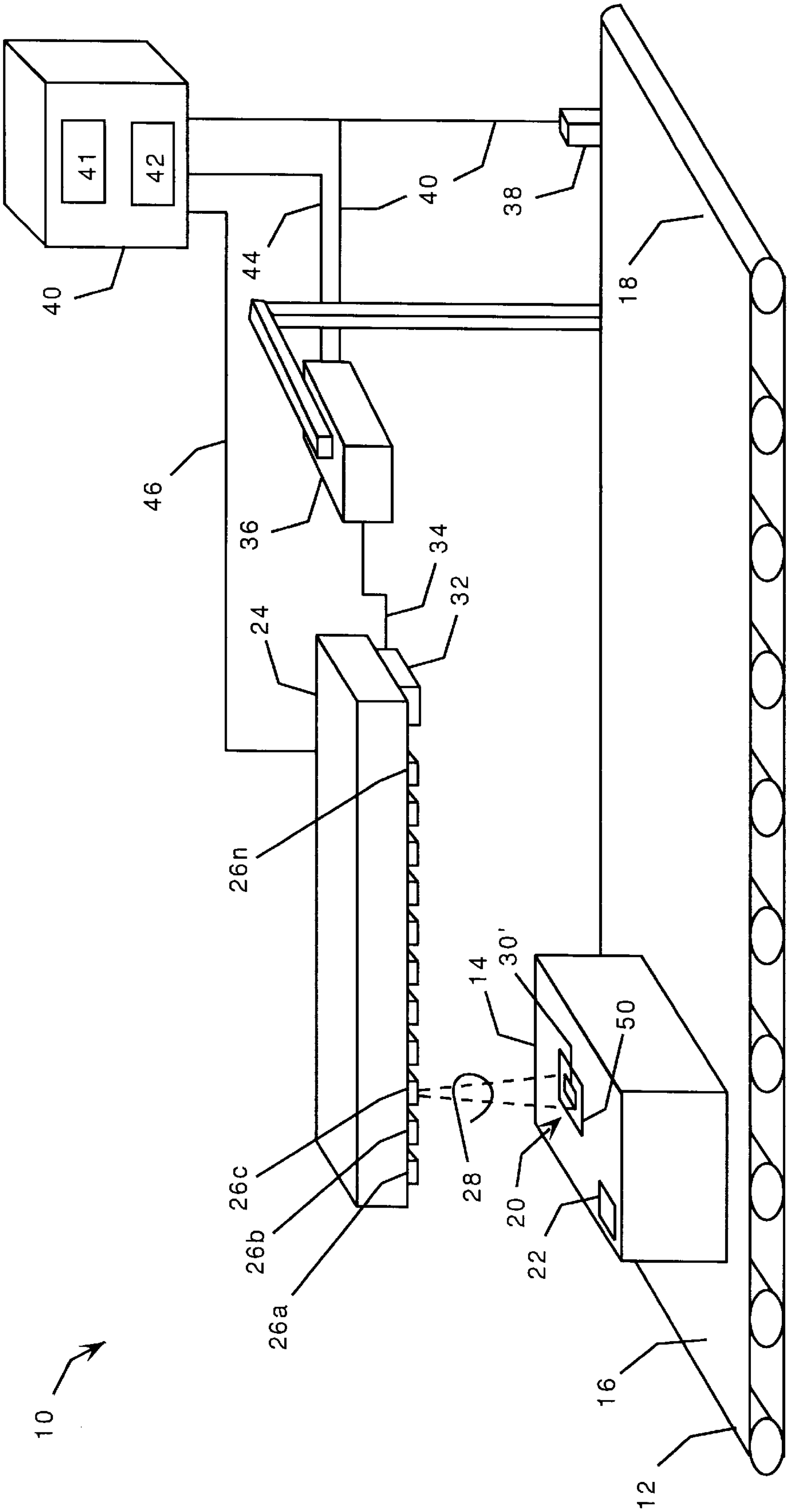
Figure 1C:
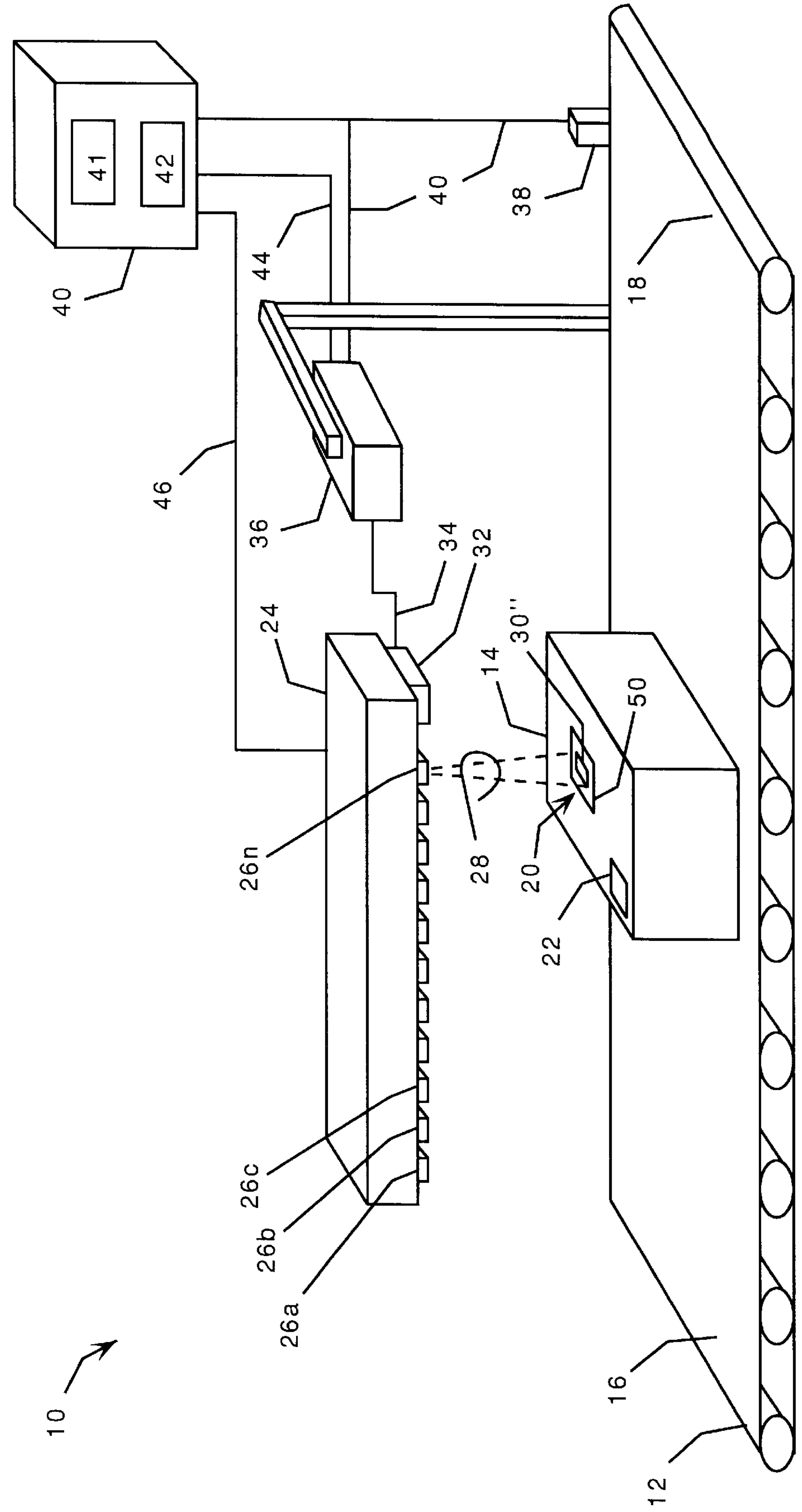
Figure 2:
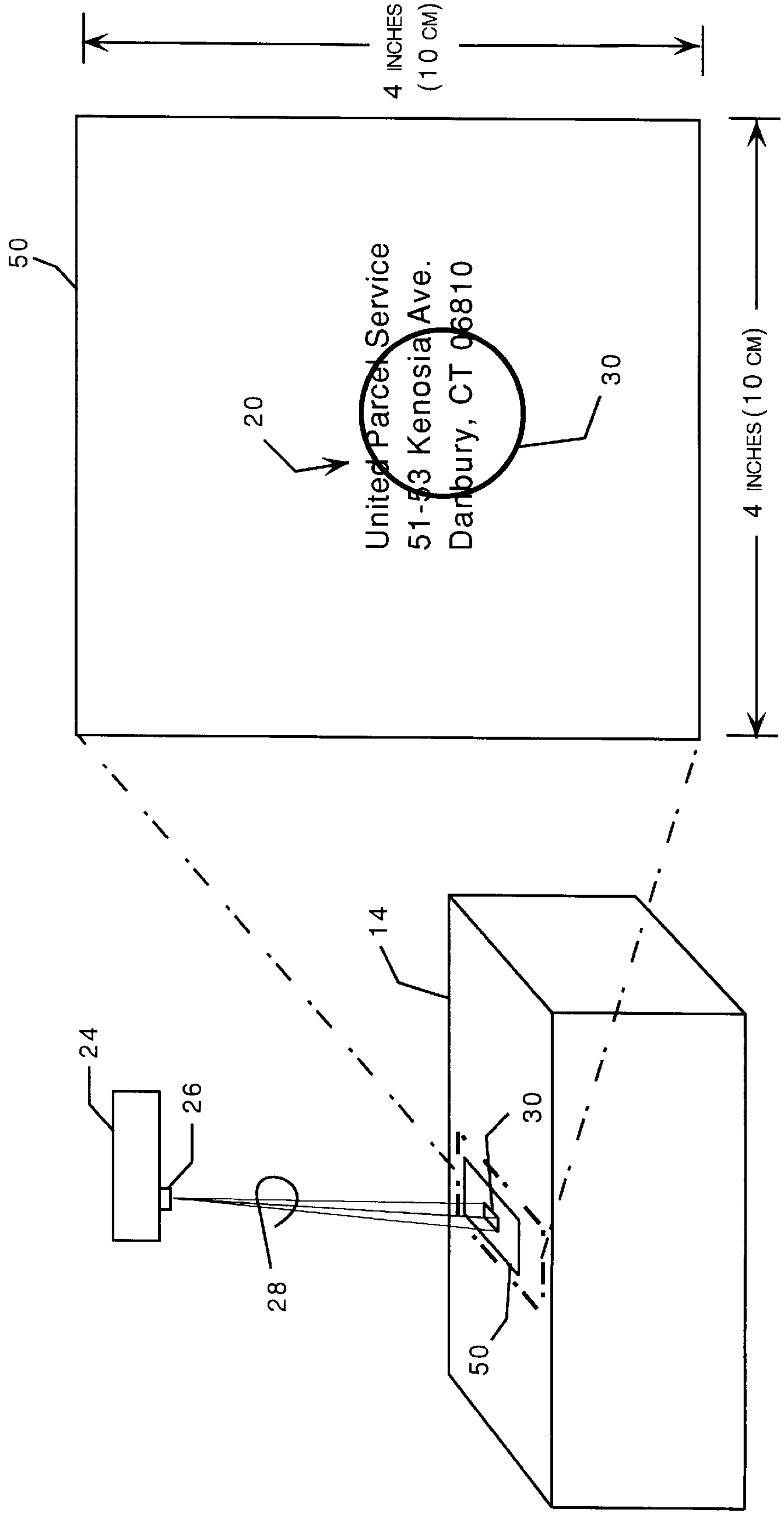
FIG. 2 illustrates a parcel with the spot defined by the moving-light system located approximately the center of the city and state address lines of the destination address.
Figure 3:
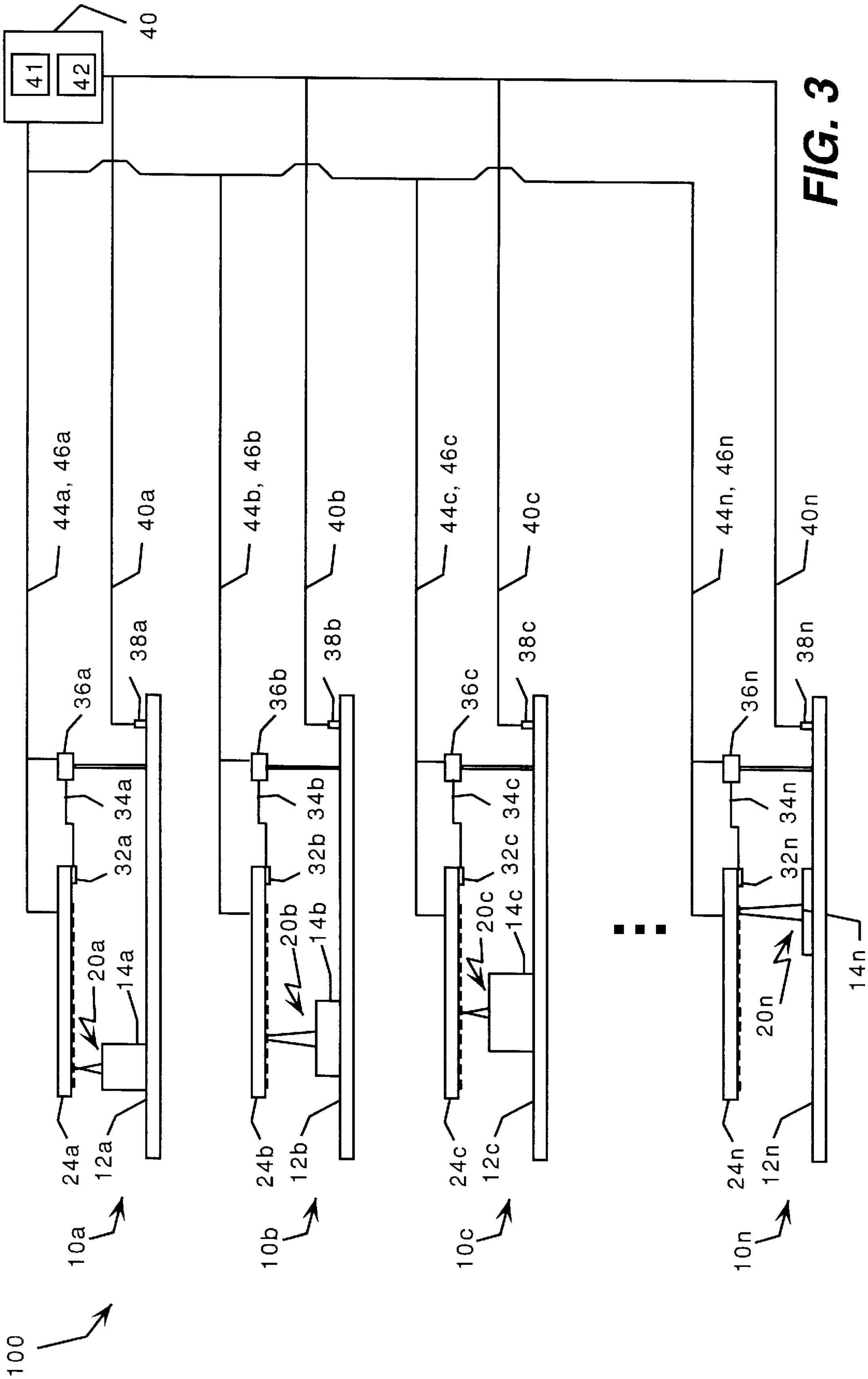
FIG. 3 illustrates a multi-conveyor indicia reader system.

Referring to the drawings, in which like numerals indicate like elements throughout the several figures, FIG. 1 illustrates a preferred embodiment of the invention, a single-conveyor moving-light indicia reader system in which a moving-light illumination source defines a spot that moves at the same speed as a conveyor to assist the positioning of a parcel on the conveyor. FIG. 2 illustrates a parcel in this moving-light indicia reader system with the spot defined by the moving-light illumination source located approximately in the center of the region to be captured. More specifically, the parcel is preferably positioned on the conveyor so that the center of the spot defined by the moving-light illumination source is approximately in the center of the city and state lines of the destination address. FIG. 3 illustrates a multi-conveyor indicia reader system, in which the illumination sources of a plurality of moving-light indicia reader systems are operated so as to time-division multiplex the storage of the images generated by the several moving-light indicia reader systems. These embodiments of the invention are described below.

FIGS. 1A-E illustrate a moving-light indicia reader system 10 including a conveyer 12 carrying a parcel 14 from an upstream location 16 to a downstream location 18 of the conveyor 12. The parcel 14 includes indicia to be read by the moving-light indicia reader system 10, such as a destination address 20. The parcel 14 may include other indicia, such as the return address 22, that the moving-light indicia reader system 10 preferably avoids reading.

The moving-light indicia reader system 10 includes a moving-light illumination source 24 that includes a plurality of discrete illumination sources 26*a* through 26*n*, such as light-emitting diodes (LEDs), that project columnar beams of light represented by the beam 28. The illumination source 24 is positioned a sufficient distance above the conveyor 12 so that the parcel 14 may be positioned on the conveyor 12 to pass beneath the moving-light illumination source 24. An operator may therefore view the spot 30, which is defined by light projected by the moving-light illumination source 24, directly on the parcel 14 as the operator positions the parcel 14 on the conveyor 12. The spot 30 thus provides an optical guide to assist the operator in positioning the parcel 14 on the conveyor 12.

A sensor assembly 32, including a height sensor and reflectivity sensor, is located toward the downstream end of the illumination source 24. A communication link 34 functionally connects the sensor assembly 32 to a scanner 36 that is located downstream from the sensor assembly 32. The scanner 36 is focused in response to height data from the height sensor, and the gain of the scanner 36 is adjusted in response to reflectivity data from the reflectivity sensor, so that the scanner 36 generates a clear image of the top of the parcel 14 at the region to be captured and stored for subsequent processing by a character recognition system 40 as the parcel 14 passes beneath the scanner 36. The scanner 36 is aligned with the spot 30 so that the scanner may be operated to capture an image of the destination address 20 on the parcel 14.

A belt encoder 38 measures the displacement of the conveyor 12. A communication link 40 functionally connects the belt encoder 38 to the scanner 36 and to a character recognition system 40 that includes a processing module 41 and a computer memory 42. A second communication link 44 functionally connects the character recognition system 40 to the scanner 36, and a third communication link 46 functionally connects the character recognition system 40 to the moving-light illumination source 24. The signal from the belt encoder 38 is used to determine the speed of the conveyor 12, which is used to synchronize the operation of the moving-light illumination source 24, the scanner 36, and the character recognition system 40 so that an image of a region 50 defined with respect to the spot 30 is stored in the computer memory 42. The height data from the sensor assembly 32 indicates the presence of a parcel 14 in association with a spot 30 so that an image of a region 50 is only stored in the computer memory 42 when a parcel 14 is present in association with a spot 30 defined by the moving-light illumination source 24.

To use the moving-light indicia reader system 10, an operator positions the parcel 14 on the conveyor 12 so that the spot 30 defined by the moving-light illumination source 24 is centered with respect to the destination address 20 on the parcel 14. For example, FIG. 1A illustrates the parcel 14 positioned so that the spot 30 defined by the first discrete illumination source 26*a* is centered with respect to the destination address 20. From this position, the parcel 14 travels on the conveyor 12, and the spot 30 travels at the same speed as the parcel 14, so that the spot 30 remains stationary relative to the parcel 14. Thus, as illustrated in FIG. 1B, the parcel 14 is later positioned so that the spot 30" defined by the third discrete illumination source 26*c* is centered with respect to the destination address 20. Later still, as illustrated in FIG. 1C, the parcel 14 is positioned so that the spot 30' defined by the last discrete illumination source 26*n* is centered with respect to the destination address 20.

Figure 1D:
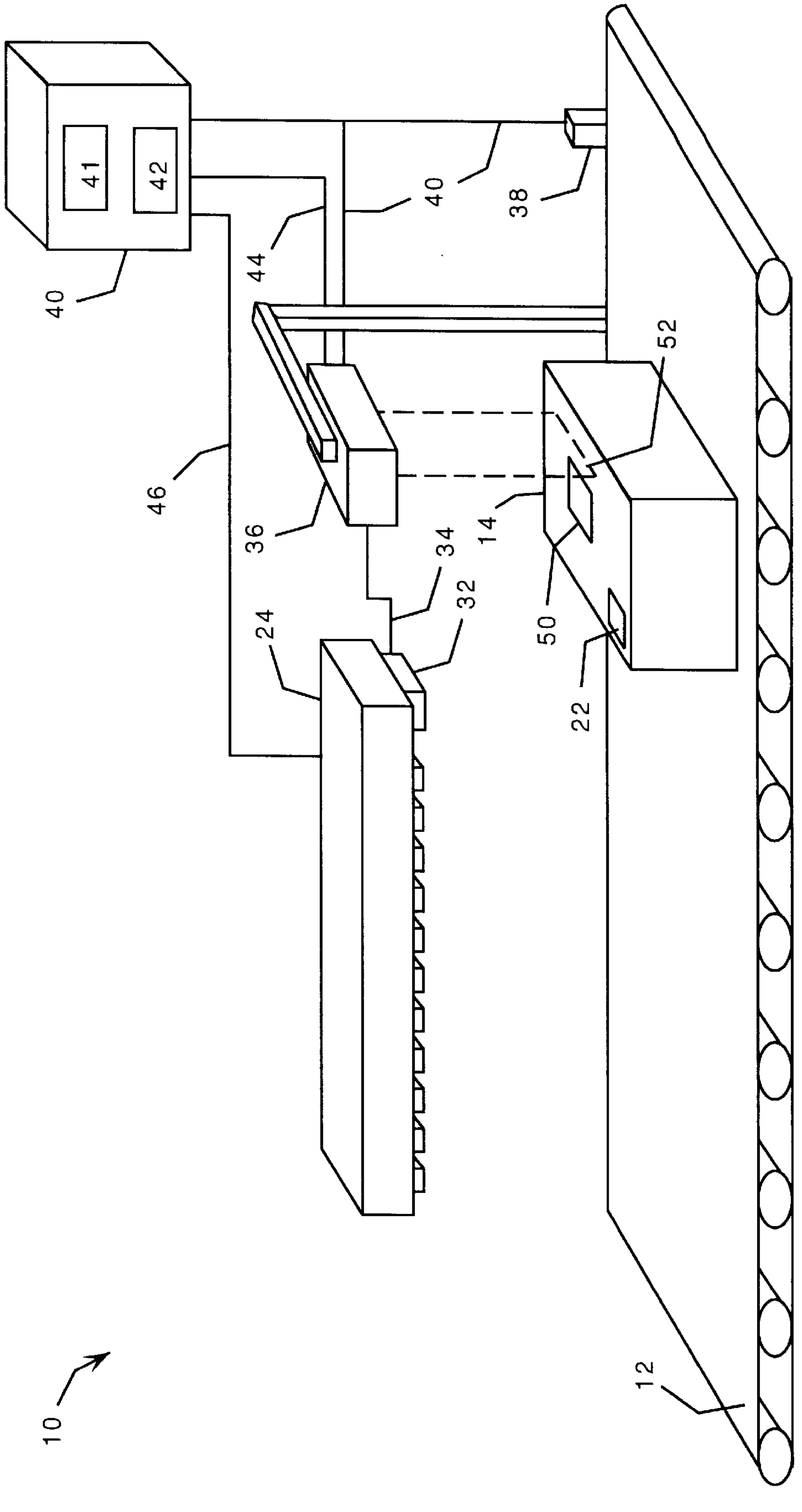
Figure 1E:
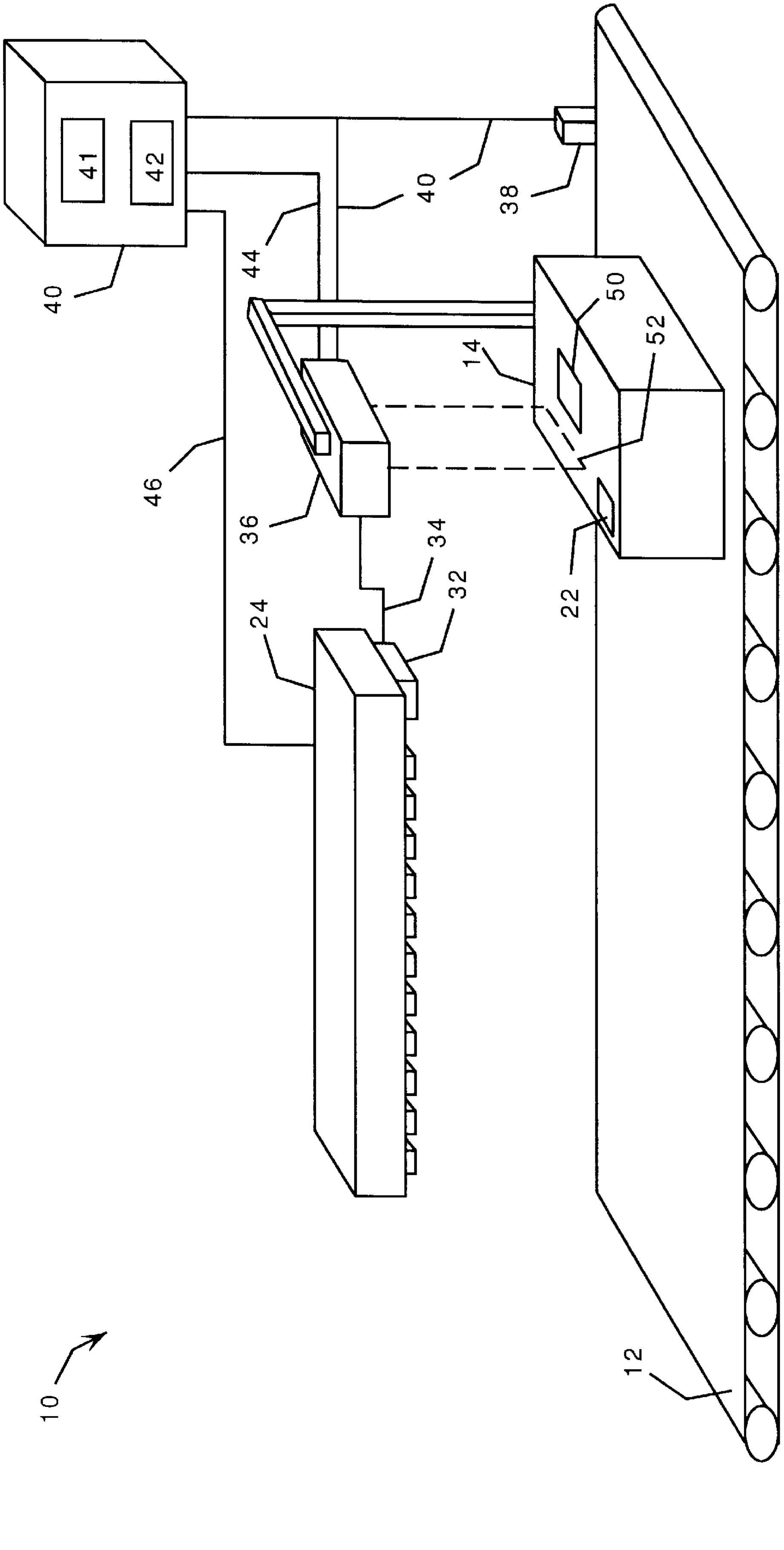

FIGS. 1D and 1E illustrate the scanning of the parcel 14 by the scanner 36, which includes a CCD array that repeatedly generates an image of a scan line 52 to generate a video signal. The operation of the scanner 36 and the processing module 41 of the character recognition system 40 are synchronized with the movement of the spot 30 so as to store in the computer memory 42 an image of the region 50, which is defined with respect to the spot 30. When the region 50 reaches the scan line 52, which happens shortly after the parcel 14 is in the position shown in FIG. 1D, the processing module 41 causes the computer memory 42 of the character recognition system 40 to begin storing the video data generated by the scanner 36. The video data generated by the scanner 36 continues to be stored until the region 50 passes the scan line 52, which happens shortly before the parcel 14 is in the position shown in FIG. 1E.

It will be understood that, when the parcel 14 is positioned as shown in FIGS. 1D–E, the spot 30 is not visible to an operator because the parcel 14 is not under the moving-light illumination source 24. Nevertheless, the character recognition system 40 uses the signal from the belt encoder 38 to keep track of the spot 30 after the parcel 14 travels past the moving-light illumination source 24. Thus, an image of the region 50, which is defined with respect to the spot 30, is stored in the computer memory 42 of the character recognition system 40.

FIG. 2 illustrates a parcel 14 with the spot 30 defined by the moving-light illumination source 24. The spot 30 is typically a round or oval area that is somewhat smaller that than the region 50 to be imaged by the scanner 36. For example, the area associated with the spot 30 may be approximately one 1 inch (2.5 cm) across, whereas the region 50 may be approximately 4 inches (10 cm) by 4 inches (10 cm). The parcel 14 is preferably positioned so that the center of the spot 30 is approximately in the center of the city and state address lines of the destination address 20. This allows the scanner 36 to capture an image of the destination address 20 by imaging the region 50.

It will be appreciated, however, that the spot may 30 may have virtually any size or configuration, and that multiple spots may be used to identify indicia on the parcel, such as four spots defining the corners of a rectangular region to be imaged. For example, the spot 30 may be defined by an illuminated area, or by an illuminated border, or by two illuminated spaced-apart parallel lines, etc. In addition, the spot may 30 could be configured to correspond to the width of the region 50 to be stored in the computer memory 24. This would assist an operator in orienting a parcel 14 so that the destination address 20 can be effectively scanned by the indicia reader system 10 as configured. Alternatively, the operator may determine that the parcel 14 cannot be oriented so that the destination address 20 can be effectively scanned by the indicia reader system 10 as configured. This may happen if the destination address 20 is larger than the region 50 to be stored in the computer memory 42. In this case, the operator can divert the parcel 14 for hand sorting or imaging using a differently configured indicia reader system.

To capture the image of the region 50, the character recognition system 40 is operative to selectively trigger the storage of an image in the computer memory 42. Triggering the storage of the image of the region 50 in the computer memory 42 may be accomplished in several different ways. For example, the scanner 36 may be toggled on and off by the processing module 41 in response to the signcontinuouse belt encoder 38. Or the scanner 36 may run continuously, and the processing module 41 may respond to the signal from the belt encoder 38 by latching a control line to an input buffer of the character recognition system 40. Alternatively, the signal from the belt encoder 38 may be used as an input to a software-based algorithm running on the processing module 41, which triggers the storage of video data from the scanner 36 in the computer memory 42. Many other means known to those skilled in the art may equivalently be employed to operate the character recognition system 40 and the scanner 36 so as to store an image of the region 50 in the computer memory 42.

Acceptable performance is experienced when moving-light indicia reader system 10 is configured as follows. The belt encoder 38 is a standard belt-driven, opto-mechanical encoder that provides a signal indicating the linear displacement of the conveyor 12. The CCD array of the scanner 36 is cycled in response to the signal from the belt encoder 38 to generate a series of analog images of the scan line 52 that are transmitted to an analog-to-digital converter within the scanner 36. The analog-to-digital converter of the scanner 36 uses a standard thresholding or similar process to convert the analog signal produced by the CCD array of the scanner 36 into an eight-bit digital video signal that is transmitted via the communication link 46 to the character recognition system 40, which is operable for storing the video data in the computer memory 42 for subsequent processing.

The scanner 36 is preferably a monochrome, 4,096 pixel line-scan type CCD array such as one using a Thompson TH7833A CCD chip. As the field of view of the scanner 36 is approximately 16 inches (41 cm) at the conveyor 12, the resolution of the image created by the scanner 32 is approximately 256 pixels or "dots" per inch (DPI) (101 dots per cm) across the field of view of the scanner 36. The belt encoder 38 preferably triggers the CCD array of the scanner 36 at a rate of approximately 256 cycles per inch (2.54 cm) so that the resolution of the image created by the scanner 32 is approximately 256 pixels or "dots" per inch (DPI) (101 dots per cm) in the direction of conveyor travel. It will therefore be appreciated that a digital image with a correct aspect ratio (i.e., the ratio of the length of the image to the width) may be generated by the scanner 36 and stored in the computer memory 42 of the character recognition system 40 by synchronizing the cycling rate of the scanner 36 with the linear speed of the conveyor 12. See, for example, Shah et al., U.S. Pat. No. 5,291,564, which is incorporated by reference.

The conveyor 12 may be approximately 24 inches (61 cm) wide and travels at linear speeds up to 20 inches per second or 100 feet per minute (51 cm per second or 30 meters per minute) or more. The moving-light illumination source 24 is preferably positioned approximately 18 inches (46 cm) above conveyor 12 and defines a spot 30 that is approximately 1 inch (2.5 cm) wide and 1 inch (2.5 cm) long at the conveyor 12. The moving-light illumination source 24 may be operated so that successive moving spots 30 are spaced virtually any distance apart For example, acceptable performance is experienced when the moving-light indicia reader system 10 is operated with the conveyor 12 traveling at 50 feet per minute (25 cm per second or 15 meters per minute), and with the moving spots 30 spaced 22 inches (56 cm) apart, which allows the moving-light indicia reader system 10 to handle approximately 1,636 parcels per hour if the operator places a parcel under each moving spot.

The scanner 36 is preferably mounted to have an optical path of approximately 120 inches (305 cm) to the conveyor 12, with a 16 inch (41 cm) field of view at the conveyor 12. To save space, the scanner 36 is positioned approximately 30 inches (76 cm) above the center of conveyer 12 and is pointed towards a complex of mirrors (not shown) that increases the optical path from the scanner 36 to the conveyor 12 to approximately 120 inches (305 cm). These parameters may be varied somewhat without unduly affecting the performance of the disclosed embodiment of the present invention. See also, Smith et al., U.S. Pat. No. 5,308,960, and Bjorner, et al., U.S. Pat. No. 5,485,263, which are incorporated by reference.

It should also be understood that the scan line 34 may be longer than the width of the region stored in the computer memory 42. For example, the scanner 32 may be positioned to have a field of view (i.e., the scan line 34) equal to approximately 16 inches (41 cm) at the conveyor 12. The region stored in the computer memory 42, however, may only be approximately 4 inches (10 cm) wide. This may be accomplished by only storing the output of a portion of the cells of the scanner 32 (e.g., the center 1,024 pixels of a 4,096 pixel scanner) in the computer memory 42.

It will be appreciated that the moving-light illumination source 24 should be long enough to allow an operator to position the parcel 14 on the conveyor 12 while the spot 30 travels from the upstream end to the downstream end of the moving-light illumination source 24. For example, a moving-light illumination source 24 having a length of 36 inches (91 cm) and 72 LEDs spaced ½ inch (1.3 cm) apart is appropriate for the conveyor 12 traveling at 10 inches per second or 50 feet per minute (25 cm per second or 15 meters per minute), as described above. The LEDs 26*a–n* of the moving-light illumination source 24 may be any of a variety of commercially available LEDs, such as a model AND190W0P manufactured by AND. The sensor assembly 32 may include any of a variety of commercially available height sensors, such as a model NR-40 manufactured by Innova Labs, Inc.

FIG. 3 is a diagram of a multi-conveyor indicia reader system 100 that includes a plurality of moving-light indicia reader systems 10*a* through 10*n*, which are virtually identical to those described above with respect to FIGS. 1A–E. Each of the moving-light indicia reader systems 10*a* through 10*n* are synchronized by, and provide their video data to, a single character recognition system 40. The character recognition system 40 synchronizes the moving spots 30*a* through 30*n* of the moving-light indicia reader systems 10*a* through 10*n* so as to time-division multiplex the storage of the regions from the several scanners 50*a* through 50*n*. In other words, the spots 50*a* through 50*n* are spaced relative to each other so that only one of the regions captured by the scanners 36*a* through 36*n* needs to be stored in the computer memory 42 of the character recognition system 40 at any time. This allows the single character recognition system 40 to store the images generated by several moving-light indicia reader systems 10*a* through 10*n*, as shown in FIG. 3.

In view of the forgoing, it will be appreciated that the moving-light indicia reader system 10 allows the video data stored in the computer memory 42 of the character recognition system 40 to be reduced to a standard-sized region that is only large enough to capture the text of the destination addresses 20 on the various parcels carried on the conveyor 12. The use of projected illumination allows the operator to view the spot 30 defined by the moving-light illumination source 24 directly on the top of the parcel 14. Thus, there is no displacement between the spot 30 and the top of the parcel 14 that could cause parallax-related alignment errors with tall parcels. In addition, the moving-light indicia reader system 10 allows the angle of the field of view of the scanner 36 to be relatively narrow so that the scanner 36 generates a sharp image of the top of the parcel 14.

It should be understood that the foregoing relates only to specific embodiments of the present invention, and that numerous changes may be made therein without departing from the spirit and scope of the invention as defined by the following claims.

What is claimed is:

1. A multi-conveyor indicia reader system comprising:

a plurality of moving-light indicia reader systems, wherein each moving-light indicia reader system comprises, a conveyor for transporting a parcel from an upstream location of the conveyor to a downstream location of the conveyor, an illumination source for defining a spot that moves at the same speed as the conveyor to assist in positioning the parcel on the conveyor, and a scanner located downstream of the optical guide and positioned to capture an image of the parcel;

a computer memory for storing the images; and means for operating the computer memory and the scanner of each moving-light indicia reader system and so as to store and image of a region of the parcel defined with respect to the spot defined by the illumination source, wherein the illumination sources are operated so as to time-division multiplex the storage of the images generated by the plurality of moving-light indicia reader systems.

2. The multi-conveyor indicia reader system of claim 1, wherein each moving-light indicia reader system further comprises:

a height sensor located upstream of the scanner and positioned to determine height data associated with the parcel at the location of the spot;

a communication link for transmitting the height data from the height sensor to the scanner; and means for focusing the scanner in response to the height data.

3. The multi-conveyor indicia reader system of claim 2, wherein each moving-light indicia reader system further comprises:

a reflectivity sensor located upstream of the scanner and positioned to determine reflectivity data associated with the parcel at the location of the spot;

a communication link for transmitting the reflectivity data from the reflectivity sensor to the scanner; and means for adjusting the gain of the scanner in response to the reflectivity data.

* * * * *